Aug. 23, 1960     H. BRETTHAÜER     2,949,831
PHOTOGRAPHIC ROLL FILM CAMERA
Filed June 10, 1958     2 Sheets-Sheet 1

Aug. 23, 1960 H. BRETTHAUER 2,949,831
PHOTOGRAPHIC ROLL FILM CAMERA
Filed June 10, 1958 2 Sheets-Sheet 2

United States Patent Office 2,949,831
Patented Aug. 23, 1960

2,949,831

PHOTOGRAPHIC ROLL FILM CAMERA

Hermann Bretthaüer, Kl. Stockheim, near Braunschweig, Germany, assignor to Franke & Heidecke, Fabrik Photographischer Prazisions-Apparate, Braunschweig, Germany, a firm of Germany Filed June 10, 1958, Ser. No. 741,071

Claims priority, application Germany June 14, 1957

6 Claims. (Cl. 95—31)

The present invention relates to photographic roll film cameras and, more particularly, to such a camera in which the film presser plate is lifted during the winding of the film to prevent scratching of the film surface. The roll film camera in the preferred embodiments is of the type in which the winding of the film is derived from a crank in a manner such that the film wind is actuated in only one direction of rotation, the crank being locked to the shutter release member in its rest position. Various arrangements have been suggested for retracting the presser plate during the winding of the film, but none has been entirely satisfactory.

An object of the invention is to provide a generally improved and more satisfactory mechanism on a roll film camera for lifting the film presser plate during the winding of the film.

Another object is to provide a new and improved mechanism on a roll film camera of the type having a crank oscillatable through a variable range for winding different frames of the film, which crank is operatively connected to a mechanism for retracting the film presser plate during the winding of the film to prevent scratching of the film.

Yet another object is the provision of a new and improved mechanism for lifting the film presser plate prior to the start of the winding of the film and for returning the presser plate to a position pressing against the film after the travel of the film has stopped.

A further object of this invention is to provide a new and improved mechanism on such a camera which is operatively connected to the film wind crank and is so arranged as to require a minimum of change in an already existing camera.

These and other desirable objects may be attained in the manner disclosed as an illustrative embodiment of the invention in the following description and in the accompanying drawings forming a part hereof, in which.

The same reference numerals throughout the several views indicate the same parts.

While the present invention, at least in its simplest form, is not limited to any particular kind or style of roll film camera, it is here disclosed by way of example in connection with a twin lens reflex camera identified by the trademark "Rolleiflex," manufactured by the firm of Franke & Heidecke, of Braunschweig, Germany, and widely known and used throughout the United States. The following disclosure of the invention presupposes familiarity with the main constructional features of the "Rolleiflex" camera, and for those not familiar with the construction of this camera, reference may be made to the book "Rollei Photography, Handbook of the Rolleiflex and Rolleicord Cameras," by Jacob Deschin, published in 1952, by Camera Craft Publishing Company, of San Francisco, California.

Figure 1:
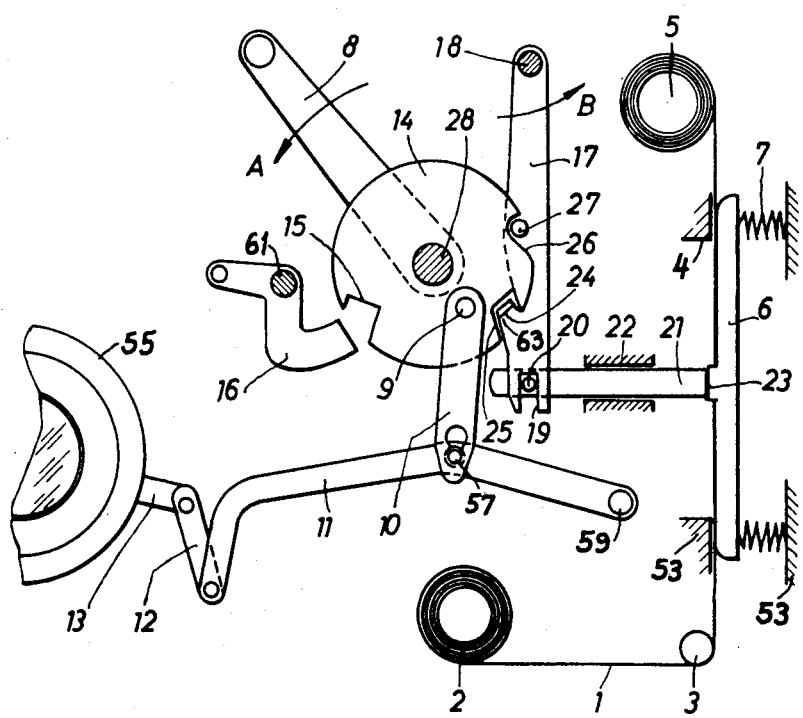
Fig. 1 is a side elevational view of a portion of a camera according to the present invention showing the camera housing in diagrammatic form.

In Fig. 1 is shown somewhat diagrammatically or schematically a camera having a film 1 mounted for travel from a supply spool 2 over a guide roller 3, and across an image aperture frame 4 to a winding-on spool 5. In the zone of the image aperture frame 4, pressure is applied to the back or non-sensitized side of the film 1 by a presser plate 6 which presses the film 1 against the image aperture frame 4 under the influence of springs 7. The image aperture frame 4 and the support means for the springs 7 are provided by portions of a housing 53, which is shown diagrammatically in this view.

A crank 8 is provided for winding the film, a conventional gear connection (not here shown) extending between the crank 8 and the winding-on spool 5 so that rotation of the crank winds the film 1. The drive from the crank to the film spool may take, for example, approximately the form disclosed in Muller Patent 2,016,-611, dated October 8, 1935, or in Muller Patent 2,148,-636, dated February 28, 1939. A circular disk 14 is connected to the crank 8 to rotate therewith, both the disk and the crank preferably being fixed to the shaft 28. The disk 14 is operatively connected to a shutter setting or tensioning mechanism and a shutter release member for the shutter 55. Only the portions of the shutter setting and release mechanisms which are essential to an understanding of this invention are shown in Fig. 1. However, the complete mechanisms may take the form shown in the above mentioned Muller Patent 2,148,636, or in Knauf Patent No. 2,629,301, dated February 24, 1953.

To provide the connections to the shutter setting linkage, a link 10 has one end pivoted at 9 to the disk 14 inwardly of its outer periphery. At its other end, the link 10 is pivoted to a pivot stud 57 located intermediate the ends of a double arm lever 11. The double arm lever 11 is fixedly pivoted by a pivot 59 at its end remote from the shutter 55, and at its other end is pivoted to a link 12 which is pivoted to the shutter setting or tensioning member 13 of the shutter schematically shown at 55. These parts correspond in general to the parts 34, 33, and 40 of said Patent 2,148,636. It can be seen that rotation of the crank 8 and connected disk 14 raises and lowers the link 10 to correspondingly move the lever 11 about the fixed pivot 59, and thus to tension or cock the shutter.

A shutter release member or trigger is operatively connected in known manner to a latch 16 having a fixed pivot 61 on a suitable portion of the camera body. The end of the latch 16 is releasably engageable with a recess 15 desirably formed on a chord of the disk 14. It is only in the normal rest position of the crank 8 that the notch or recess 15 is opposite the end of the latch 16; therefore it is only in this rest position of the crank that the shutter release can be operated to make an exposure.

A suitable linkage is provided and is arranged to be actuated by rotation of the crank 8 and disk 14 to urge the presser plate 6 backwardly away from the surface of the film 1 while the film is being wound. To this end, a lever 17 is pivoted at its upper end about a fixed pin 18, the other end being coupled by a fork 19 and a pin 20 to a slide member 21 which is movable in a path approximately perpendicular to the presser plate 6 in a guideway 22 formed by appropriate portions of the camera body. The end of the slide 21 is engageable with a projection 23 on one side of the presser plate 6. Movement of the slide 21 outwardly toward the presser plate 6 to an operative position presses the projection 23 and the presser plate 6 away from the back of the film 1 against the action of the springs 7. This backward and forward movement is actuated by the disk 14.

For this purpose the lever 17 is desirably provided with an inwardly and obliquely extending projection 63 having a laterally extending oblique lug or ear 24 at its outer end. In the rest position of the disk 14, the lug 24 is received within a recess 25 in the disk 14, which recess extends obliquely along a chord of the disk. Counterclockwise rotation of the crank 8 and disk 14, in the direction of the arrow A (which is the film feeding direction) moves the lug 24 and lever 17 outwardly until it clears the recess 25, after which the lug 24 rides on the periphery of the disk 14.

In order that the lug 24 shall not enter the recess 15, especially during prolonged rotation of the crank 8 through several revolutions as when winding on the leading strip and trailing strip of the film 1, an additional recess 26 is formed in the disk 14 in a position spaced counterclockwise from the recess 25. In the rest position of the parts, the recess 26 receives a laterally extending pin 27 on the lever 17. The recess 26 is so shaped at one side as to slide past the pin 27 and tend to cam the pin outwardly during counterclockwise or film feeding rotation of the disk 14. The opposite side of the recess 26 need not be of cam shape, however, as the crank 8 is never turned in a reverse direction (clockwise when viewed in Fig. 1) beyond its normal rest position illustrated. During continued counterclockwise rotation of the crank 8, the pin 27 rides on the periphery of the disk 14 to prevent entry of the lug 24 into the recess 15. By this double latching arrangement, the slide 21 is retained in its active position pressing against the projection 23 to release the presser plate, until the crank is turned a fraction of a revolution back or clockwise to the rest position, whereupon both the lug 24 and the pin 27 may seat within their respective recesses on the disk 14.

As well known by those familiar with "Rolleiflex" cameras, film feeding from one exposure frame to the next is accomplished by forward rotation (counterclockwise when viewed as in Fig. 1) of the crank 8 through less than one complete revolution, the extent of rotation being variable on account of the variable diameter of the film winding roll or spool 5 as more and more film is wound thereon. At the end of each forward rotation of the crank, it is then returned by reverse rotation to its rest position, whereupon the parts 24 and 27 can seat themselves again in their respective recesses 25 and 26. But when the crank is turned forwardly through more than one complete revolution (as when winding the leader strip or trailer strip of the film) it is desirable that the projections 24 and 27 shall not drop into the recesses 25 and 26 when the recesses come opposite the projections during the continued forward rotation. This is accomplished by the oblique or chord-like shape of the recess 25. During forward rotation, the lug 24 cannot drop into the recess 25 until the disk 14 has turned counterclockwise somewhat beyond the rest position illustrated in Fig. 1, and by this time the full depth of the recess 26 will have passed a little beyond the pin 27, so that the pin will now prevent the lever 17 from moving to fully relaxed position.

Figure 3:
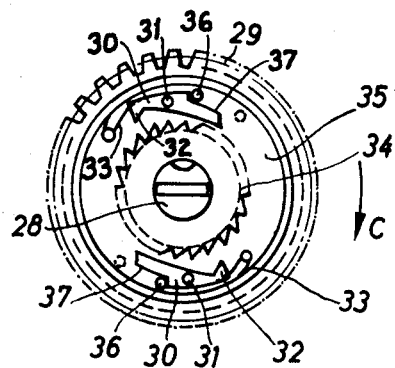
Fig. 3 is a side elevational view of a portion of the mechanism shown in Figs. 1 and 2.

With an arrangement as described, it is desirable that the film movement should commence only after the presser plate 6 is lifted. A clutch mechanism as shown in Fig. 3 is provided for this purpose. The winding spool 5 is driven by a gear 29 on the crank shaft or spindle 28, which shaft is connected to the gear 29 by a lost motion connection whereby the shaft 28 is turned an initial amount before the gear 29 begins to turn. It is to be noted that in Fig. 3 the parts are viewed from the opposite direction to the viewing direction of Fig. 1, so that the direction of rotation indicated by the arrow C in Fig. 3 is actually the same as that indicated by the arrow A in Fig. 1.

Referring now to Fig. 3, a pair of opposing pawls 30 are provided, each pawl being pivoted to the gear 29 by a pivot pin 31. The nose 32 of each pawl 30 is urged inwardly by a spring 33 acting between the gear 29 and its respective pawl 30. A ratchet wheel 34 is fixed to the crank spindle 28. A disk 35 is mounted on the shaft 28 and has a frictional connection with the shaft. The disk 35 is provided with a pair of pins 36 which are engageable with running surfaces or cam surfaces 37 on the tail ends of the respective pawls 30.

In the rest position of the clutch mechanism, the pins 36 engage with the running surfaces or cam surfaces 37 on the pawls 30 to hold the noses 32 outwardly out of engagement with the teeth on the ratchet wheel 34. When the crank spindle 28 is turned in the direction of the arrow C, the disk 35 initially turns with it, on account of the frictional connection between the spindle and the disk. After a short extent of turning which is sufficient, however, to displace the presser plate 6 rearwardly, the pins 36 are moved beyond and out of engagement with the cam surfaces 37 on the pawls 30, whereupon the springs 33 move the noses 32 into latching engagement with the teeth on the ratchet wheel 34. Thus after the slight initial movement, the gear 29 becomes connected to the crank 8 and shaft 28 to rotate therewith during the remainder of the forward movement of the crank.

Upon reverse movement of the crank 8 (regardless of whether this reverse movement follows a forward movement of several revolutions or only a fraction of one revolution) the frictionally mounted disk 35 will tend to turn with the crank 8 and shaft 28, but the gear 29 will tend to remain stationary, on account of the frictional resistance inherent in the intermediate driving gears between the gear 29 and the film spool 5, or on account of a suitable pawl (not shown) which positively prevents reverse motion of the driving gears, if desired. The pins 36 on the disk 35 will therefore ride up on the cam surfaces or running surfaces 37 of the pawls 30, swinging these pawls to their unlatched or ineffective positions, and the pins 36 will engage the abutment shoulders on the pawls, as seen in Fig. 3. During further reverse movement of the crank 8 and shaft 28, the gear 29 and disk 35 will both remain stationary, the disk slipping on the rotating shaft. When the crank is turned again in the forward direction, the disk will begin to turn with the shaft, and the driving connection to the spool 5 will be re-established after the presser plate 6 has been shifted to its released position, all as previously described above.

In reviewing the operation of the embodiment of the invention shown in Figs. 1 and 3, the slide 21 is initially in its rest position in which it is retracted from the projection 23 on the presser plate 6 so that the presser plate 6 is urged by the action of the springs 7 against the back of the film 1 pressing it against the image aperture frame 4. In this rest position, both the lug 24 and the pin 27 on the lever 17 are engaged within their respective recesses 25, 26. The shutter release latch 16 is also opposite in its recess 15 on the disk 14, so that the shutter release can be operated. On rotation of the crank 8 from its rest position in the direction of the arrow A, in Fig. 1, or in the direction of the arrow C in Fig. 3, the clutch arrangement of Fig. 3 acts in the manner already described to engage the pawl noses 32 with the ratchet wheel 34 after the removal of the lug 24 from its recess 25. That is, the disk 14 urges the lug 24 and lever 17 rearwardly to shift the slide 27 outwardly against the projection 23 to lift the presser plate 6 from the back of the film 1 against the action of the spring 7, before the film driving gear 29 becomes operatively connected to the crank 8. The presser plate 6 is consequently raised or moved to released position before the film begins to move. Upon rotation of the disk 14, the link 10 is raised to move the arm 11 to operate the shutter setting or tensioning mechanism in a conventional manner. When the counterclockwise movement of the crank 8 is stopped by the film metering mechanism (not shown, but operating as in the above mentioned patents), the crank 8 is rotated clockwise back to its rest position. The clutch mechanism of Fig. 3 operates as already described to retract the pawls away from the ratchet wheel 34. At the end of the reverse rotation of the crank 8 and disk 14, the parts 24 and 27 drop into their respective recesses 25 and 26, and the springs 7 are once more able to press the presser plate 6 forwardly to its effective film-flattening position.

Figure 2:
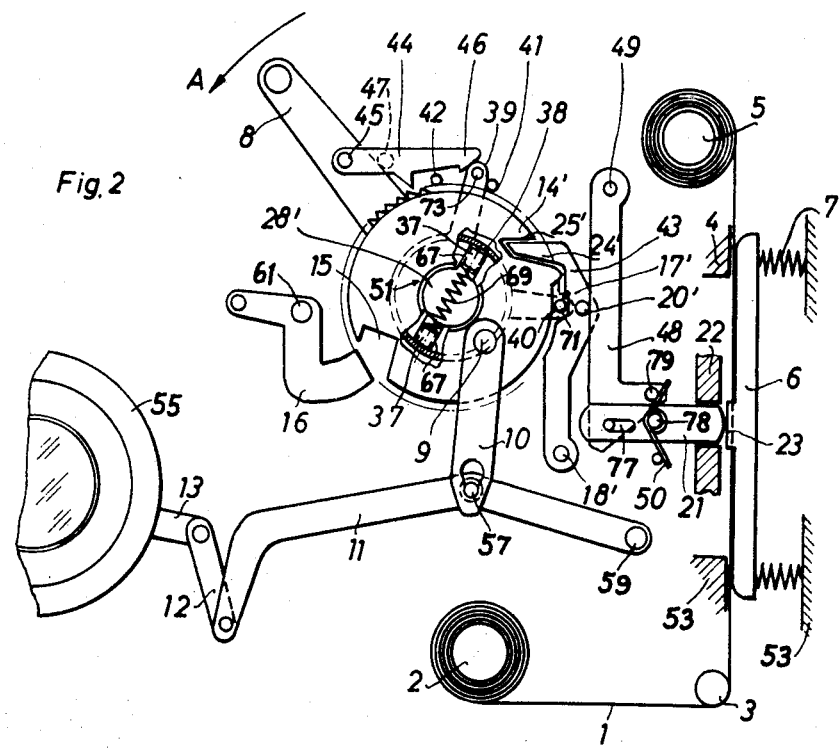
Fig. 2 is a view similar to Fig. 1 with portions broken away and in section showing another embodiment of a roll film camera according to the present invention.

In the modified form of the invention as shown in Fig. 2, many of the corresponding elements are given the same numerals as in the Fig. 1 embodiment, and require no further description. The former lever 17 is here replaced by a lever 17' which is pivoted at its lower end on a pivot 18' carried by a suitable stationary portion of the body. At its upper end, the lever 17' has an inwardly extending projection 24' which is engageable in a recess 25' in the disk 14'. The recess 25' preferably extends obliquely on a chord of the disk 41'.

As before, the spindle 28' has a clutch mechanism, as shown in Fig. 3, associated with it. In addition, a drum 38 is mounted concentric with the spindle 28'. The spindle 28' carries a friction clutch 51 comprising a pair of opposing friction plugs 37 movable within radially extending cylindrical guideways 67 and urged outwardly by a diametrically extending spring 69. The drum 38 has fixed to it a pair of spaced radially extending arms 39 and 40. The arm 40 has a laterally projecting pin 71 at its outer end which rides on a cam surface 43 at the inner or forward edge of the lever 17'. The arm 39, and consequently the entire drum 38, is limited in its rotation by a pair of circumferentially spaced stop pins 41 and 42 mounted in a stationary position on a fixed part of the camera body. In the rest position of the mechanism, the arm 39 abuts the pin 41, and the arm 40 and its pin 71 are located in such position with respect to the lever 17' that the projection 24' is allowed to enter fully into the disk recess 25'. The stop pin 42 limits the counterclockwise rotation of the arms 39 and 40 and is located in such position that when the arm 39 is abutting the pin 42, the pin 71 rides on the inner cam surface 43 of the lever 17' in a position to hold the projection 24' out of the recess 25'. The oblique nose 24' on the lever 17' is cammed out of the notch 25' at the beginning of the rotation, thus swinging the lever 17' rearwardly or clockwise on its pivot 18', to open the film gate or release the presser plate 6, as further explained below. Because of the action of the friction clutch 37, the drum 38 turns counterclockwise with the crank 8, to carry the pin 71 to a position to hold the lever 17' in the rearward position, keeping the presser plate released during the continuance of counterclockwise rotation of the crank. After a short initial movement of the crank, sufficient to release the presser plate from the film, the clutch parts 30, 32, 34, become engaged in the same way previously described in connection with Figs. 1 and 3, and the rotation of the film spool 5 takes place. When the notch 15 of the disk 14' passes the nose 24' of the lever 17', the nose does not drop into this notch because it is held by the pin 71 attached to the arm 40 on the drum 38, which arm and drum now remain stationary in their extreme counter-clockwise position, the clutch 37 merely slipping during continuance of rotation of the crank 8. Likewise if it is necessary to turn the crank through more than one complete revolution (e.g., when winding the leader strip or the trailer strip of the film) the pin 71 will hold the arm 17' as long as the winding continues, and will not allow the nose 24' to drop into the notch 25'.

During the return or clockwise movement of the crank 8, the parts 17', 38, 71 are still held in the described position (for releasing the pressure of the presser plate 6) by means of a latch 44 pivoted on a fixed pivot pin 45 on the body of the camera and having a nose 46 at one end and with a downwardly extending hook portion. As the arm 39 moves from its rest to its operative position, the nose 46 rides over and engages behind a laterally extending pin 73 on the arm 39, holding the arm 39 in place during the return movement of the crank 8 even though the friction clutch 37 tends to rotate the drum 38 and its arms in a clockwise direction.

Toward the end of the return or clockwise rotation of the crank 8, just before it reaches its final rest position, the crank engages a projection 47 on the lever 44, and rocks the lever 44 to remove the nose 46 from the pin 73 on the arm 39. Thereafter the friction clutch operates to rotate the drum 38 with its associated arms 39 and 40 to the rest position. As the arm 40 moves clockwise, of course, the pin 71 on the arm 40 slides on the cam surface 43 of the lever 17' to permit the projection 24' again to enter the recess 25' on the disk 14'.

To transmit motion of the lever 17' to the slide 21, an intermediate lever 48 is provided and is so arranged that the stroke of the lever 17' is transmitted with a step-up ratio. The lever 48 is pivoted at its upper end on a fixed pivot 49 carried by a suitable portion of the body, and is moved by contact with the pin 20' on the lever 17'. At its lower end, the lever 48 has a lost motion pin and slot connection 77 with the slide 21. A spring 50 is coiled around a pin 78 on the slide 21 and has one end reacting against a pin 79 on the lever 48 and its other end reacting against a fixed pin carried by the camera body. Desirably two levers 48 are provided at opposite sides of the camera body and are mounted on a common shaft 49. Each lever 48 is connected in the described manner to a slide 21 at its side of the body, so that the two slides act upon opposite side edges of the presser plate 6. The springs 50 serve to allow the lever 48 to move farther than the slide 21 and plate 6, thus assuring full desired movement of the presser plate by providing for greater-than-necessary movement of the parts 17' and 48.

By the invention, the winding crank 8 is conveniently operatively connected to the slide 21 to move the slide to an operative position lifting the presser plate 6 away from the back of the film when the crank is rotated. The presser plate operating parts are so arranged that the plate-controlling projection 24 or 24' does not fall into the release latch recess 15 during continued rotation of the crank. By the provision of the clutch mechanism of Fig. 3, the presser plate is lifted away from the film before the film begins to move and is not returned to rest position until after travel of the film has stopped.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic roll film camera comprising means for mounting a film for movement from a supply spool to a winding spool across an image aperture frame, a presser plate, spring means normally urging said presser plate against said film, a winding crank operatively connected to said winding spool and having a rest position, a control disk connected to said crank for rotation therewith, a slide, means for guiding said slide between a retracted position and an operative position urging said presser plate away from said film, linkage means operatively connected between said disk and slide for operating said slide upon rotation of said crank, a shutter release latch, a first recess in said disk for receiving said shutter release latch, a projection on said linkage means, a second recess in said disk for receiving said projection when said crank and disk are in rest position, and means for preventing said projection from entering said first recess during rotation of said crank and disk.

2. A construction as defined in claim 1, including clutch means for said winding crank for moving said slide to said operative position prior to the movement of said winding spool and for stopping the movement of said winding spool prior to the return of said slide to said retracted position.

3. A photographic camera comprising means for holding a portion of a strip of film in position to be exposed, a presser plate for pressing against said film in exposure position, a spool, rotatable to advance said film, a rotary film winding member having a control disk connected thereto to turn therewith, said winding member and control disk having a normal rest position assumed between successive film advancing movements, a spring tending to press said presser plate against said film, a first notch in said control disk, a control lever having a portion adapted to lie in said first notch when said disk is in said normal rest position, said control lever being operatively connected to said presser plate to relieve pressure of said presser plate against said film except when said portion of said lever lies in a notch of said disk, rotation of said control disk in a film winding direction from said rest position serving to move said portion of said lever out of said notch to relieve said pressure of said presser plate, a shutter release control notch also in said disk, said shutter release control notch being brought to a position opposite said portion of said control lever when said disk is rotated, and means preventing said portion of said lever from entering said shutter release control notch when said last mentioned notch reaches a position opposite said portion of said lever during rotation of said winding member and control disk.

4. A construction as defined in claim 3, further including a gear mounted for rotation coaxially with said winding member and operatively connected to said spool to drive said spool from rotation of said gear, and a lost motion connection for driving said gear from rotation of said winding member only after a sufficient initial turning of said winding member to move said portion of said lever to relieve said pressure of said presser plate.

5. A construction as defined in claim 4, in which said lost motion connection includes a ratchet fixed to said disk, a pawl pivoted on said gear for engaging said ratchet to drive said gear from said disk, and a pawl controlling member frictionally coupled to said disk to tend to turn therewith and capable of remaining stationary when held against rotation while said disk turns, said controlling member serving to move said pawl on its pivot from an effective coupling position engaging said ratchet to an ineffective uncoupled position disengaged from said ratchet.

6. A photographic roll film camera comprising means for mounting a film for movement from a supply spool to a winding spool across an image aperture frame, a presser plate for pressing against a portion of said film in an exposure position, spring means normally urging said presser plate against said film portion, a rotary winding crank and a control disk connected thereto to turn therewith, said winding crank and control disk having a rest position assumed between successive film advancing movements, a first notch in said control disk, a control lever pivoted at one end and having a projection engaged in said first notch when said disk is in said rest position, a slide guided for movement between a retracted position spaced from said presser plate and an operative position urging said presser plate away from said film, means for coupling said slide and control lever so that said slide is in said retracted position when said projection is engaged in said first notch and is in said operative position when said projection is disengaged from said first notch, rotation of said winding crank in a film winding direction from said rest position serving to disengage said projection from said first notch, a shutter release control notch also in said disk, said shutter release control notch being adapted to receive a shutter release latch when said disk is in said rest position, and means for preventing said control lever projection from entering said shutter release control notch during rotation of said winding crank and disk.

References Cited in the file of this patent

UNITED STATES PATENTS

| | | |
|---|---|---|
| 2,770,177 | Faulhaber | Nov. 13, 1956 |
| 2,788,724 | Weiss | Apr. 16, 1957 |
| 2,819,663 | Lachaize | Jan. 14, 1958 |